US010261234B2

United States Patent
Kang et al.

(10) Patent No.: US 10,261,234 B2
(45) Date of Patent: Apr. 16, 2019

(54) LIGHT GUIDE PLATE OF BACKLIGHT UNIT AND LIQUID CRYSTAL DISPLAY DEVICE INCLUDING THE SAME

(71) Applicant: SAMSUNG DISPLAY CO., LTD., Yongin-si, Gyeonggi-do (KR)

(72) Inventors: Yongkyu Kang, Hwaseong-si (KR); Seulgi Kim, Seoul (KR); Minyoung Song, Asan-si (KR); Kangwoo Lee, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/861,761

(22) Filed: Jan. 4, 2018

(65) Prior Publication Data
US 2018/0203177 A1     Jul. 19, 2018

(30) Foreign Application Priority Data

Jan. 13, 2017 (KR) ........................ 10-2017-0005911

(51) Int. Cl.
*F21V 7/04*     (2006.01)
*F21V 8/00*     (2006.01)
*G02F 1/1335*     (2006.01)

(52) U.S. Cl.
CPC ......... *G02B 6/0036* (2013.01); *G02B 6/0043* (2013.01); *G02B 6/0061* (2013.01);
(Continued)

(58) Field of Classification Search
CPC ............... G02B 6/0036; G02B 6/0043; G02F 1/133504; G02F 1/133536
See application file for complete search history.

(56) References Cited

U.S. PATENT DOCUMENTS

| | | | |
|---|---|---|---|
| 7,976,207 B2 * | 7/2011 | Kim ..................... | G02B 6/0036 362/355 |
| 2009/0268484 A1 * | 10/2009 | Kim ..................... | G02B 6/0036 362/608 |

(Continued)

FOREIGN PATENT DOCUMENTS

| KR | 100819542 B1 | 3/2008 |
|---|---|---|
| KR | 100964284 B1 | 6/2010 |

(Continued)

OTHER PUBLICATIONS

European Search Report for European Patent Application No. 18151329.1 dated May 4, 2018.

*Primary Examiner* — Ali Alavi
(74) *Attorney, Agent, or Firm* — Cantor Colburn LLP

(57) ABSTRACT

A display device includes: a display panel; a light source; and a light guide plate receiving light from the light source and providing the light to the display panel. The light guide plate includes an upper surface facing the display panel, a light incident surface facing the light source and a light opposing surface opposing the light incident surface. The upper surface includes a lens pattern and the lower surface incudes a prism pattern, the prism pattern includes a plurality of prisms arranged along a first direction from the light incident surface to the light opposing surface, each of the prisms has a length extending in a second direction along a length of the light incident surface, and among the prisms arranged along the first direction within the prism pattern, the lengths of the prisms increase as a distnace from the light incident surface increases.

21 Claims, 12 Drawing Sheets

(52) U.S. Cl.
CPC ......... *G02B 6/0068* (2013.01); *G02B 6/0073* (2013.01); *G02F 1/133504* (2013.01); *G02F 1/133536* (2013.01); *G02F 1/133615* (2013.01); *G02F 2001/133507* (2013.01); *G02F 2001/133531* (2013.01)

(56) References Cited

U.S. PATENT DOCUMENTS

2009/0323372 A1\* 12/2009 Kurihara ................ G02B 6/002
362/620
2010/0165254 A1\* 7/2010 Lee ....................... G02B 6/0036
349/65

FOREIGN PATENT DOCUMENTS

| KR | 101059656 B1 | 8/2011 |
| KR | 101429176 B1 | 8/2014 |
| KR | 101429487 B1 | 8/2014 |

\* cited by examiner

LIGHT GUIDE PLATE OF BACKLIGHT UNIT AND LIQUID CRYSTAL DISPLAY DEVICE INCLUDING THE SAME

This application claims priority to Korean Patent Application No. 10-2017-0005911, filed on Jan. 13, 2017, and all the benefits accruing therefrom under 35 U.S.C. § 119, the content of which in its entirety is herein incorporated by reference.

BACKGROUND

1. Field

Exemplary embodiments of the invention relate to a display device having relative lightweight, thinness and high luminance.

2. Description of the Related Art

Liquid crystal display ("LCD") devices are one of most widely used types of flat panel display ("FPD") devices. An LCD device includes two substrates including electrodes therein and a liquid crystal layer interposed therebetween. Upon applying voltage to the two electrodes, liquid crystal molecules of the liquid crystal layer are rearranged such that an amount of transmitted light is controlled in the LCD device.

An LCD device, which is a passive light emitting device, includes a display panel which displays an image and a backlight unit for providing light to the display panel. The backlight unit is classified into a direct type backlight unit, an edge type backlight unit and a corner type backlight unit according to the position of the light source within the LCD device.

The edge type backlight unit is widely used because it is relatively easy to manufacture, light in weight and low in power consumption as compared to the direct type backlight unit. In the edge type backlight unit, a plurality of optical sheets for diffusing and collimating light provided from the light source may be disposed as a separate element between a light guide plate and the display panel.

SUMMARY

Exemplary embodiments of the invention are directed to a display device which has a reduced overall thickness by omitting an optical sheet separate from a light guide plate and substantially prevents degradation in image quality.

According to an exemplary embodiment, a display device includes: a display panel which displays an image with light; a light source which generates the light; and a light guide plate which receives the light from the light source and provides the light to the display panel. The light guide plate includes: an upper surface facing the display panel, the upper surface including a lens pattern, a lower surface opposing the upper surface, the lower surface including a prism pattern, a light incident surface facing the light source, and a light opposing surface opposing the light incident surface. The prism pattern includes a prism provided in plurality arranged along a first direction from the light incident surface to the light opposing surface, each of the prisms has a length extending in a second direction along a length of the light incident surface, and among the prisms arranged along the first direction within the prism pattern, the lengths of the prisms increase as a distance from the light incident surface increases.

The prism may be a recessed portion of the light guide plate or a protruded portion of the light guide plate.

The length of the prism may be in a range from about 3 μm (micrometers) to about 300 μm.

The prism may include an inclined surface extended from the lower surface of the light guide plate. The inclined surface of the prism may form an angle ranging from about 127 degrees to about 134 degrees with respect to the lower surface.

For prisms arranged adjacent to each other along the first direction, the inclined surfaces thereof may not be parallel to each other.

Each of the prisms may have a width extending in the first direction, and the width may range from about 3 μm to about 30 μm.

A pitch may be defined in the first direction between prisms arranged adjacent to each other along the first direction, and among the prisms arranged along the first direction within the prism pattern, the pitches of the prisms decrease as the distance from the light incident surface increases.

The prism pattern may be provided in plurality arranged along the second direction.

A pitch may be defined in the second direction between a first prism of a first prism pattern and a second prism of a second prism pattern arranged adjacent to each other along the second direction, and the pitch may be in a range from about 50 μm to about 300 μm.

The lens pattern may include a lens provided in plurality arranged along the second direction, each of the lenses having a semicircular or semi-elliptical cross-section and a length extending in the first direction.

The lens may have a width extending in the second direction, the width ranging from about 3 μm to about 30 μm.

The lens may have a height extending from the upper surface of the light guide plate, the height ranging from about 3 μm to about 15 μm.

The prism pattern may be provided in plurality along the second direction, and the light guide plate may further include a light scattering pattern provided in plurality between the prism patterns.

The light scatterning patterns may be arranged along the first direction, and among the light scattering patterns arranged along the first direction, a density of the light scattering patterns may be reduced as the distance from the light incident surface increases.

The light scattering pattern may have a discrete non-linear shape.

The light scattering pattern may have a discrete dot shape.

According to another exemplary embodiment, a display device includes: a display panel which displays an image with light; a light source which generates the light; and a light guide plate which receives the light from the light source and provides the light to the display panel. The light guide plate includes: an upper surface facing the display panel, the upper surface including a lens pattern, a lower surface opposing the upper surface, the lower surface including a prism pattern, a light incident surface facing the light source, and a light opposing surface opposing the light incident surface. A virtual line is defined extended in a first direction from the light incident surface to the light opposing surface, the virtual line perpendicular to a length of the light incident surface, the prism pattern includes a prism provided in plurality arranged along a center line extended in the first direction, the center line tilted by an angle ranging from about 0.5 degrees to about 10 degrees with respect to the virtual line, each of the prisms has a length extending in a second direction along the length of the light incident surface, and among the prisms arranged along the center line tilted with respect to the virtual line, the lengths of the prisms increase as a distance from the light incident surface increases.

According to another exemplary embodiment, a display device includes: a display panel which displays an image with light; a light source which generates the light; and a light guide plate which receives the light from the light source and provides the light to the display panel. The light guide plate includes: an upper surface facing the display panel, the upper surface comprsing a lens pattern, a lower surface opposing the upper surface, the lower surface incluidng a prism pattern, a light incident surface facing the light source, and a light opposing surface opposing the light incident surface. The prism pattern of the lower surface of the light guide plate includes a plurality of prisms arranged along a first direction from the light incident surface to the light opposing surface, each of the prisms has a length extending in a second direction along a length of the light incident surface, among the prisms arranged along the first direction within the prism pattern, the lengths of the prisms increase as a distance from the light incident surface increases, and with respect to a virtual line extended in the first direction to be perpendicular to the length of the light incident surface, the lens pattern of the upper surface of the light guide plate has a length forming a tilting angle ranging from about 0.5 degrees to about 10 degrees with respect to the virtual line.

The foregoing is illustrative only and is not intended to be in any way limiting. In addition to the illustrative features, exemplary embodiments and features described above, further features, exemplary embodiments and features will become apparent by reference to the drawings and the following detailed description.

BRIEF DESCRIPTION OF THE DRAWINGS

A more complete appreciation of the invention will become more apparent by describing in detail exemplary embodiments thereof with reference to the accompanying drawings, where.

DETAILED DESCRIPTION

Figure 1:
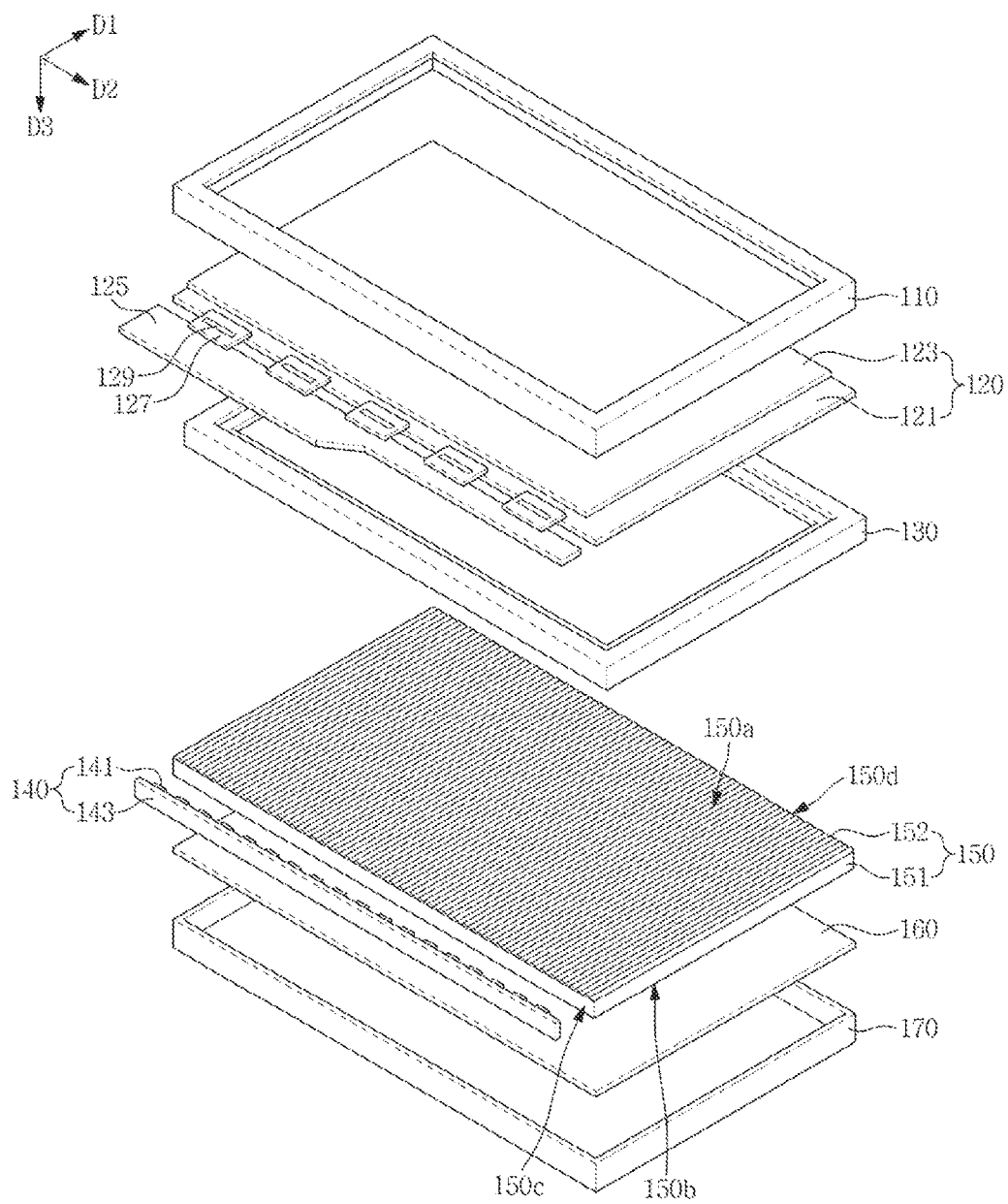
FIG. 1 is an exploded perspective view illustrating an exemplary embodiment of a display device according to the invention.

Exemplary embodiments will now be described more fully hereinafter with reference to the accompanying drawings. Although the invention may be modified in various manners and have several exemplary embodiments, exemplary embodiments are illustrated in the accompanying drawings and will be mainly described in the specification. However, the scope of the invention is not limited to the exemplary embodiments and should be construed as including all the changes, equivalents and substitutions included in the spirit and scope of the invention.

In the drawings, thicknesses of a plurality of layers and areas are illustrated in an enlarged manner for clarity and ease of description thereof. When a layer, area, or plate is referred to as being related to another elements such as being "on" another layer, area, or plate, it may be directly on the other layer, area, or plate, or intervening layers, areas, or plates may be present therebetween. Conversely, when a layer, area, or plate is referred to as being related to another element such as being "directly on" another layer, area, or plate, intervening layers, areas, or plates are absent therebetween. Further when a layer, area, or plate is referred to as being related to another element such as being "below" another layer, area, or plate, it may be directly below the other layer, area, or plate, or intervening layers, areas, or plates may be present therebetween. Conversely, when a layer, area, or plate is referred to as being related to another element such as being "directly below" another layer, area, or plate, intervening layers, areas, or plates are absent therebetween.

The spatially relative terms "below," "beneath," "less," "above," "upper" and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in the other direction and thus the spatially relative terms may be interpreted differently depending on the orientations.

Throughout the specification, when an element is referred to as being "connected" to another element, the element is "mechanically or physically" to the other element, or "electrically connected" to the other element with one or more intervening elements interposed therebetween.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises," "comprising," "includes" and/or "including," when used in this specification, specify the presence of stated features, integers, steps, operations, elements and/or components, but do not preclude the presence or addition of one or more other features, integers, steps, operations, elements, components and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10% or 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Some of the parts which are not associated with the description may not be provided in order to specifically describe exemplary embodiments of the invention and like reference numerals refer to like elements throughout the specification.

A conventional display device including a plurality of optical sheets between a light guide plate and a display panel to control a direction of light provided to the display panel, has an increased overall thickness owing to the plurality of optical sheets disposed as separate elements from the light guide plate and the display panel. Therefore, there exists an increasing tendency to omit the plurality of optical sheets between the light guide plate and the display panel, thereby forming a slimmer display device.

Although a display device is described as being an LCD device in exemplary embodiments, exemplary embodiments are not limited thereto, and a display device in which a display panel that receives light from a backlight unit to display an image may be included in the scope of the invention.

FIG. 1 is an exploded perspective view illustrating an exemplary embodiment of a display device according to the invention.

Referring to FIG. 1, the display device according to an exemplary embodiment includes an upper frame 110, a display panel 120, an intermediate frame 130, a light source unit 140, a light guide plate 150, a reflection sheet 160 and a lower frame 170.

Hereinafter, the intermediate frame 130, the light source unit 140, the light guide plate 150, the reflection sheet 160 and the lower frame 170 are collectively referred to as a backlight unit.

The upper frame 110 has an opening window defined therein for exposing an active area of the display panel 120 to outside the display device and is disposed so as to cover a front edge and a side surface of the display panel 120. The upper frame 110 may include a relatively rigid metal material such as stainless steel or a material having relatively good heat dissipation properties such as aluminum or an aluminum alloy.

The display panel 120 may be provided in a quadrangular plate shape and receive an electric signal from outside thereof to display an image. The display panel 120 may include a first (display) substrate 121, a second (display) substrate 123 opposing the first substrate 121, an optical control layer such as a liquid crystal layer (not illustrated) between the first substrate 121 and the second substrate 123, or the like.

The first substrate 121 includes a plurality of pixel electrodes arranged in a matrix, a switching element such as a thin film transistor applying a driving voltage to each of the pixel electrodes, and various signal lines for driving the pixel electrodes and the thin film transistor.

The second substrate 123 is disposed to oppose the first substrate 121. The second substrate 123 includes a common electrode including a transparent conductive material and a color filter. The color filter may include red, green and blue color filters.

The liquid crystal layer (not illustrated) is interposed between the first substrate 121 and the second substrate 123. An orientation of molecules of the liquid crystal layer is rearranged by an electric field formed between the pixel electrode and the common electrode. As such, the rearranged liquid crystal layer adjusts or controls the transmittance of light emitted from the backlight unit, and the adjusted light passes through the color filter to display an image to outside the display panel 120.

In addition, a lower polarizer (not illustrated) may be disposed on a rear surface of the first substrate 121 and an upper polarizer (not illustrated) may be disposed on an upper surface of the second substrate 123. The upper polarizer and the lower polarizer may have a total planar area corresponding to that of the display panel 120.

The upper polarizer may transmit only a specific polarized light among light arriving from the outside the display panel and absorb or block the remaining light. The lower polarizer plate may transmit only a specific polarized light among the light output from the backlight unit, and absorb or block the remaining light.

A driving circuit board 125 may be disposed on at least one side of the display panel 120. The driving circuit board 125 may generate and/or apply various control signals or a power signal for driving the display panel 120.

The display panel 120 and the driving circuit board 125 may be electrically connected to each other by at least one flexible printed circuit board ("FPCB") 127. The FPCB 127 may be a chip on film ("COF") or a tape carrier package ("TCP"). The number of the FPCBs 127 may have various values depending on the size and driving scheme of the display panel 120.

A driving chip 129 may be mounted on the FPCB 127. The driving chip 129 may generate various driving signals for driving the display panel 120. The driving chip 129 may be represented by a driver integrated circuit ("IC") or a source IC in which a timing controller and/or a data driving circuit are integrated into one chip.

The intermediate frame 130 may support a rear edge of the display panel 120 and may accommodate the light source unit 140, the light guide plate 150, the reflection sheet 160, or the like.

The intermediate frame 130 may have a polygonal frame shape in which a hollow space is defined. In an exemplary embodiment, for example, the intermediate frame 130 may have a quadrangular frame shape in which an empty space is defined. The intermediate frame 130 may be formed as a single, unitary member or may be formed from a plurality of separately provided pieces as required and then assembled. The intermediate frame 130 may include a flexible material such as plastic, or may be formed as an injection molded member such as through an injection molding process or the like.

The light source unit 140 includes a light source 141 and a light source substrate 143 on which the light source 141 is disposed.

The light source 141 may be disposed at an edge or one side surface of the light guide plate 150. That is, the light source 141 may generate and emit light to the edge or one side surface of the light guide plate 150. The light source 141 may include at least one light emitting diode ("LED") chip (not illustrated) and a package (not illustrated) for accommodating the LED chip. In an exemplary embodiment, for example, the LED chip (not illustrated) may be a gallium nitride (GaN)-based LED chip emitting a blue light.

The number of the light sources 141 may have various values in consideration of the size of the display panel 120, luminance uniformity, or the like. The light source substrate 143 may be a printed circuit board ("PCB") or a metal printed circuit board ("metal PCB").

The light source unit 140 may be disposed or formed on one side surface, opposite side surfaces or all four side surfaces of the light guide plate 150 in consideration of the size and luminance uniformity of the display panel 120. That is, the light source unit 140 may be disposed or formed on at least one of edge portions of the light guide plate 150. Herein, the light source unit 140 is assumed to be disposed on one side surface of the light guide plate 150.

Although not illustrated in FIG. 1, a wavelength conversion unit (not illustrated) may be disposed between the light source unit 140 and the light incident surface of the light guide plate 150. The wavelength conversion unit (not illustrated) may include a material for converting the wavelength of light emitted from the light source unit 140. In an exemplary embodiment, for example, the wavelength conversion unit may convert the wavelength of a blue light emitted from a blue LED light source into a white light.

Although described as a plate, such as having a relatively large cross-sectional thickness for ease of description, for convenience of explanation, the light guide plate 150 may be formed in the form of a sheet or a film for slimming down the display device. The light guide plate 150 may be provided in a sheet or film shape for which the cross-sectional thickness is smaller than that of the plate and is relatively small as compared to the planar size thereof, That is, the light guide plate 150 may include both a plate and a film for guiding light.

Hereinafter, one surface of the light guide plate 150 facing the display panel 120 is referred to as an upper surface 150a, another surface of the light guide plate 150 opposing the upper surface 150a is referred to as a lower surface 150b, another surface of the light guide plate 150 facing the light guide plate 140 is referred to as a light incident surface 150c, and another surface of the light guide plate 150 opposing the light incident surface 150c is referred to as a light opposing surface 150d. Side surfaces of the light guide plate 150 connect the upper surface 150a and the lower surface 150b to each other, and the light incident surface 150c may be one of the side surfaces. Light is emitted from the light guide plate 150 through the upper surface 150a and light is incident into the light guide plate 150 through the light incident surface 150c.

For convenience of explanation, a direction perpendicular to the light incident surface 150c is referred to as a first direction D1, a direction along which a length of the light incident surface 150c extends is referred to as a second direction D2, and a thickness direction of the light guide plate 150 is referred to as a third direction D3. The display device and components thereof are disposed in a plane defined by the first and second directions D1 and D2, while a thickness of the display device and components thereof are taken in the third direction D3.

The light guide plate 150 according to an exemplary embodiment may include a body portion 151 and a lens pattern 152 disposed or formed on the body portion 151.

The body portion 151 may include a material having a light transmitting property, such as an acrylic resin, e.g., polymethylmethacrylate ("PMMA"), polycarbonate, and a tempered glass, so as to efficiently guide the light. The body portion 151 may define portions of side surfaces and/or the lower surface 150b of the light guide plate 150.

The lens pattern 152 disposed or formed on the body portion 151 may include a hard coating exclusive resin, and the resin may be ultraviolet ("UV")-cured to have properties similar to polycarbonate. The resin may include an oligomer, a monomer, a photoinitiator, silicone, or the like, and may be classified into a soft resin and a hard resin depending on the content of the silicone and monomer.

The details of the shape of the plurality of lenses within the lens pattern 152 disposed or formed on the body portion 151 will be described below.

The reflection sheet 160 may include, for example, polyethylene terephthalate ("PET") and be reflective, and one surface of the reflection sheet 160 may be coated with a diffusion layer including, for example, titanium dioxide. In addition, the reflection sheet 160 may include a material including a metal such as silver (Ag).

The lower frame 170 may include a metal material having relatively good rigidity and heat dissipation characteristics. In an exemplary embodiment, for example, the lower frame 170 may include at least one selected from stainless steel, aluminum, an aluminum alloy, magnesium, a magnesium alloy, copper, a copper alloy and an electrogalvanized steel sheet.

Figure 2:
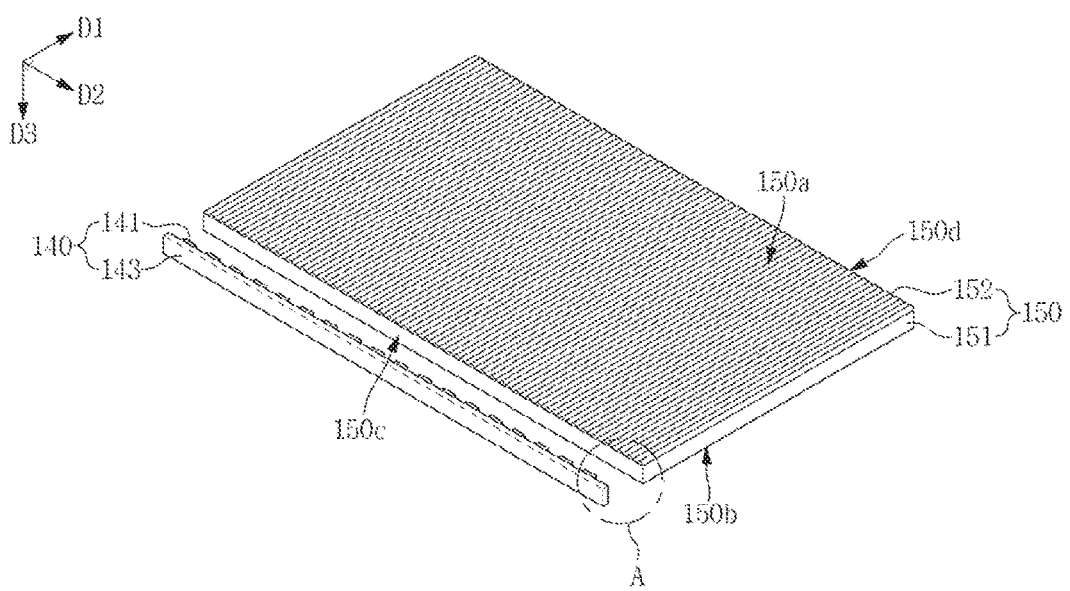
FIG. 2 is a perspective view illustrating an exemplary embodiment of a light guide plate and a light source unit according to the invention.
Figure 3:
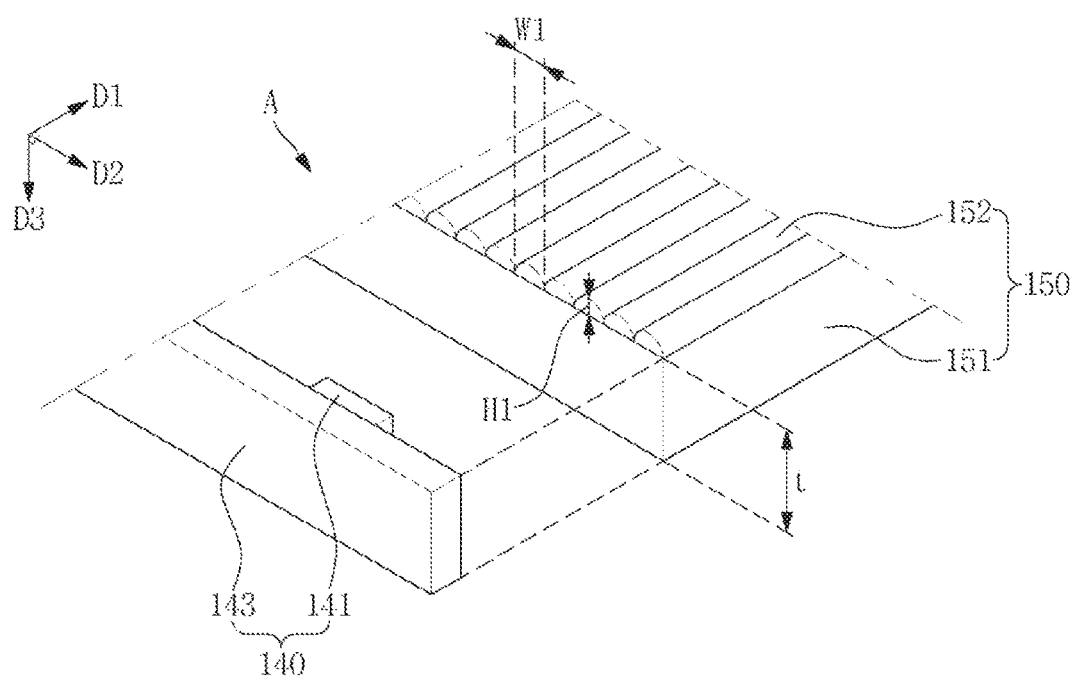
FIG. 3 is an enlarged perspective view illustrating area "A" of FIG. 2.

FIG. 2 is a perspective view illustrating the light guide plate and the light source unit according to an exemplary embodiment, and FIG. 3 is an enlarged perspective view illustrating area "A" of FIG. 2. FIGS. 2 and 3 are perspective views illustrating the upper surface 150a of the light guide plate 150 and the light incident surface 150c of the light guide plate 150 according to an exemplary embodiment.

Referring to FIGS. 2 and 3, the light guide plate 150 according to an exemplary embodiment may include the lens pattern 152 extended from an upper surface of the body portion 151 such as to define the upper surface 150a of the light guide plate 150. Each of the lenses of the lens pattern 152 may be lengthwise elongated in the first direction D1, and the lenses are arranged along the second direction D2. In FIG. 3, numeral 152 is used to indicate a single lens for convenience of explanation, but numeral 152 may be considered as indicating the collection of lenses. Each lens may have a semicircular or semi-elliptical cross-section, but exemplary embodiments are not limited thereto. In an exemplary embodiment, for example, each lens may have a circular or triangular cross-section and the cross-sectional areas of the plurality of lenses may be different from each other. Alternatively, the lens pattern 152 may include a plurality of lenses elongated in the second direction D2 and arranged in the first direction D1. The lenses of the lens pattern 152 extend from a common surface of the body portion 151, such as from the upper surface thereof. Portions of the upper surface of the body portion 151 which are between the lenses are coplanar with each other.

A thickness t of the body portion 151 according to an exemplary embodiment may be in a range from about 0.5 millimeter (mm) to about 3.5 millimeters (mm). As an example, when including PMMA or PC, the body portion 151 may have a thickness t in a range from about 2.0 mm to about 3.5 mm. As another example, when including a tempered glass, the body portion 151 may have a thickness t in a range from about 0.5 mm to about 1.5 mm.

The lens according to an exemplary embodiment may have a width W1 ranging from about 3 micrometers (μm) to about 30 μm in the second direction D2 and a height H1 ranging from about 3 μm to about 15 μm in the third direction D3. FIGS. 2 and 3 illustrate that lenses disposed adjacent to each other in the second direction D2 are continuously formed, that is, having no space therebetween. However, exemplary embodiments are not limited thereto, and the plurality of lenses may be disposed or formed at a predetermined distance from each other in the second direction D2.

The light guide plate 150 according to an exemplary embodiment includes the lens pattern 152 as the upper surface 150a of the light guide plate 150 so that light emitted from the light guide plate 150 may be collimated and the light guide plate 150 may not be visible from the outside.

Figure 4:
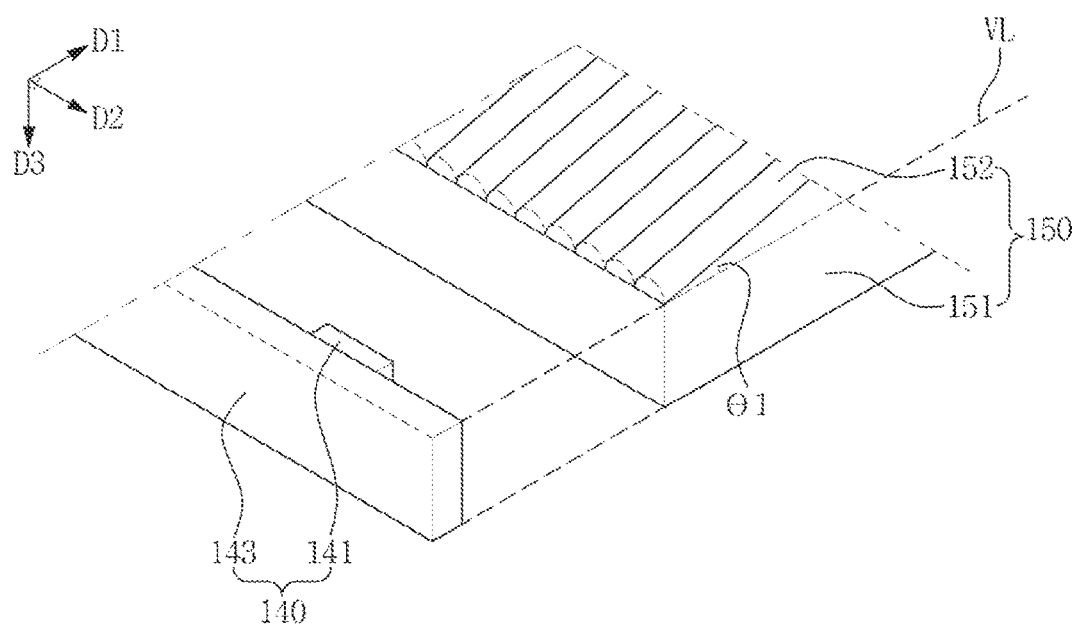
FIG. 4 is an enlarged perspective view illustrating a modified exemplary embodiment of a light guide plate and a light source unit according to the invention.

FIG. 4 is an enlarged perspective view illustrating a modified exemplary embodiment of a light guide plate 150 relative to a light source unit 140 according to the invention. For example, FIG. 4 is a perspective view illustrating an upper surface 150a and a light incident surface 150c of the light guide plate 150 according to an alternative exemplary embodiment. For convenience of explanation, repeated description of the light guide plate 150 described above will be omitted from the description related to the light guide plate 150 of FIG. 4.

Referring to FIG. 4, the light guide plate 150 according to an alternative exemplary embodiment may include a lens pattern 152 including a plurality of lenses disposed or formed on the body portion 151 so as to define the upper surface 150a of the light guide plate 150. In a top plan view of the plane defined by the first and second directions D1 and D2, the lenses of the lens pattern 152 may each extend with a tilting angle θ1 ranging from about 0.5 degrees to about 10 degrees with respect to a virtual line VL parallel to a first direction D1.

As such, the light guide plate 150 according to an alternative exemplary embodiment is configured such that the plurality of lenses forming the collective lens pattern 152 as the upper surface 150a of the light guide plate 150 are inclined at a predetermined tilting angle θ1 with respect to the virtual line VL parallel to the first direction D1, and accordingly, a moiré stain may be substantially prevented from appearing.

Figure 5:
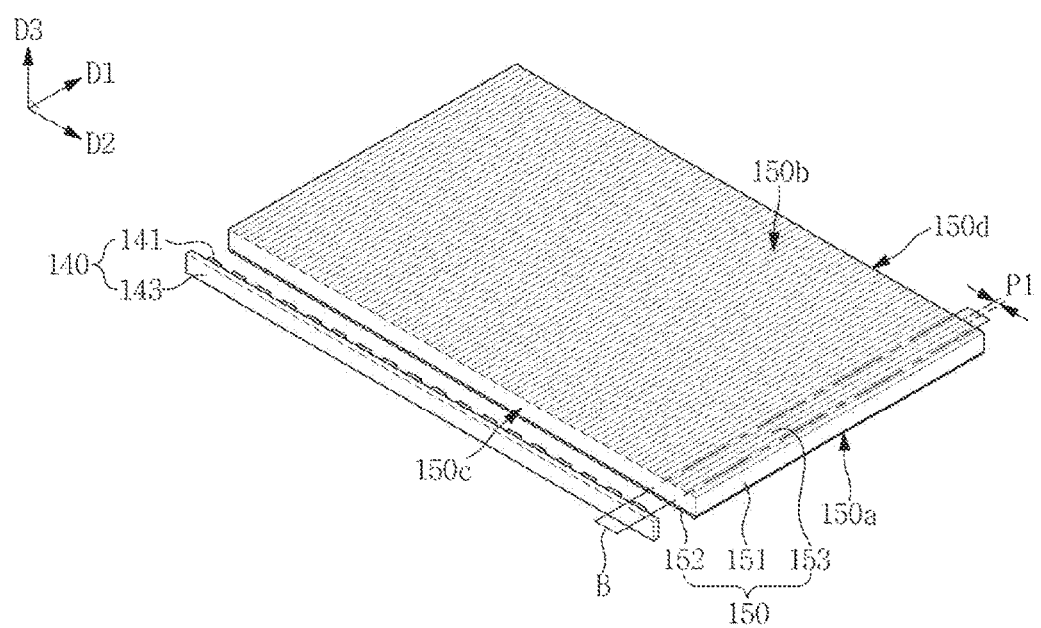
FIG. 5 is a perspective view illustrating another exemplary embodiment of a light guide plate and a light source unit according to the invention.
Figure 6:
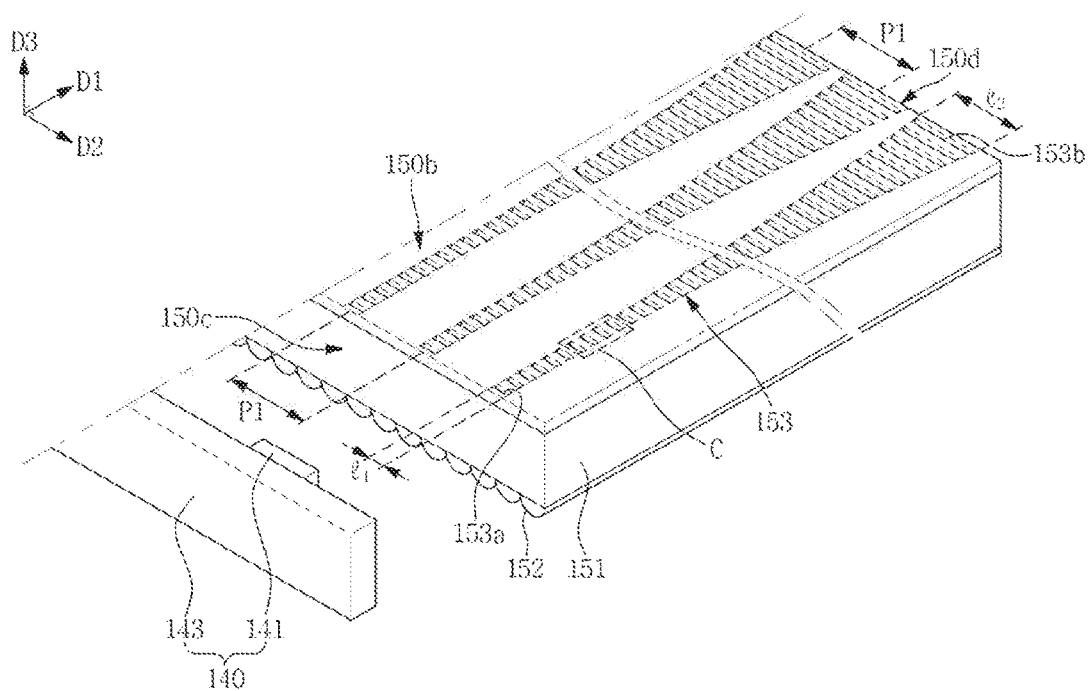
FIG. 6 is an enlarged perspective view illustrating area "B" of FIG. 5.
Figure 7:
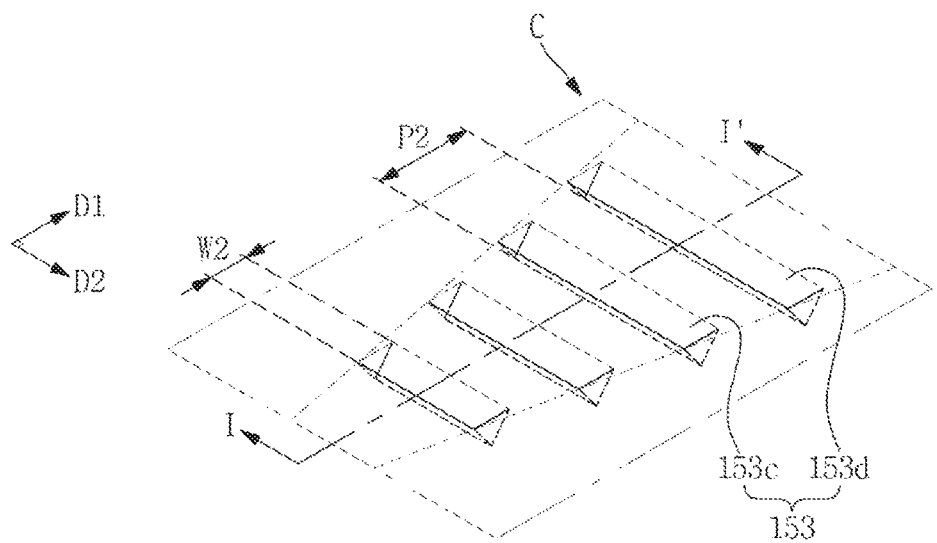
FIG. 7 is an enlarged perspective view illustrating area "C" of FIG. 6.
Figure 8:
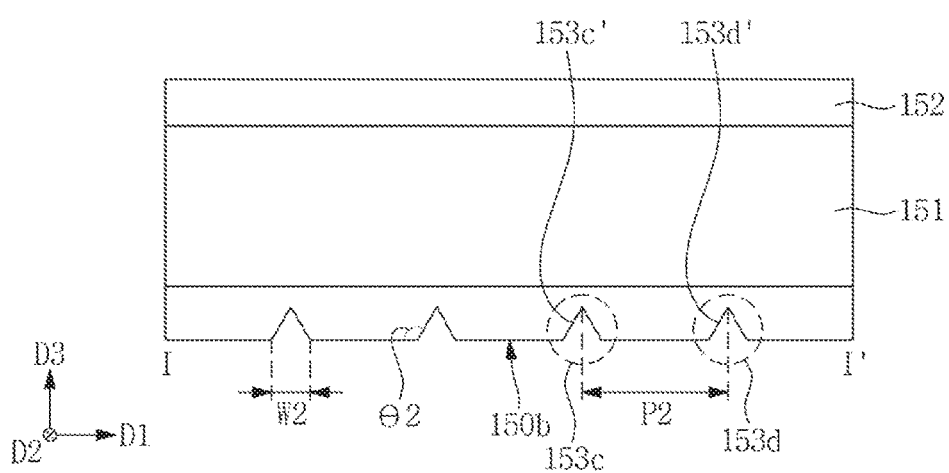
FIG. 8 is an enlarged cross-sectional view taken along line I-I' of FIG. 7.

FIG. 5 is a perspective view illustrating another exemplary embodiment of a light guide plate and a light source unit according to the invention, FIG. 6 is an enlarged perspective view illustrating area "B" of FIG. 5, FIG. 7 is an enlarged perspective view illustrating area "C" of FIG. 6, and FIG. 8 is a cross-sectional view taken along line I-I' of FIG. 7. FIGS. 5 and 6 are perspective views illustrating the lower surface 150b and the light incident surface 150c of the light guide plate 150 according to an exemplary embodiment.

Referring to FIGS. 5 and 6, the light guide plate 150 according to an exemplary embodiment may include a prism pattern 153 disposed or formed at the lower surface 150b of the light guide plate 150. The prism pattern 153 may include a plurality of prisms as a material or layer separate from that of the body portion 151, but the invention is not limited to. In an alternative embodiment, the prisms of the prism pattern 153 may be defined by portions of the body portion 151.

The prism pattern 153 may include a plurality of prisms, including prism 153a, prism 153b and prisms therebetween, arranged along the first direction D1 perpendicular to the light incident surface 150c. A single one prism may be arranged along the first direction D1. Each prism among the prism 153a, the prism 153b and prisms therebetween may have a length which extends in the second direction D2 parallel to the light incident surface 150c. The prisms are discrete shapes disposed spaced apart from each other.

The lengths of the plurality of prisms arranged along the first direction D1 may increase gradually as a distance from the light incident surface 150c increase. That is, a length l1 of a (first) prism 153a adjacent to (e.g., closest to) the light incident surface 150c is the smallest and a length l2 of a (last) prism 153b disposed adjacent to (e.g., closest to) the light opposing surface 150d is the largest.

Each of the prisms of the prism pattern 153 may have a length ranging from about 3 μm to about 300 μm. Lengths of the prisms within a prism pattern 153 increase as a distance of the prisms from the light incident surface 150c increases.

The prisms of the prism pattern 153 according to an exemplary embodiment may be formed in at least one of an engraved (e.g., recessed) form and an embossed (e.g., protruded) form, relative to a common surface of the body portion 151 of the light guide plate 150. In FIGS. 5 through 8, the prisms of the prism pattern 153 according to an exemplary embodiment are assumed to be engraved (e.g., recessed) patterns, extended into the body portion 151 of the light guide plate 150 from a lowermost surface 150b of the overall light guide plate 150. That is, it is considered that the body portion 151 extends to include a portion (or layer) of the light guide plate 150 in which the prisms are recessed. Inclined surfaces of the prisms and the lower surface of the body portion 151 may together form the lower surface 150b of the overall light guide plate 150. Portions of the lower surface 150b which are between the prisms are coplanar with each other.

The prism pattern 153 as a group of prisms arranged in the first direction D1, may be provided in plurality along a second direction D2 parallel to the light incident surface 150c. A pitch P1 between the plurality of prism patterns 153 disposed adjacently along the second direction D2 may be in a range of about 50 μm to about 300 μm. The pitch P1 is taken between same positions among the prisms within a group of prisms arranged in the first direction D1 defining the prism pattern 153, such as being between virtual lines taken commonly at the center of each prism, but not being limited thereto.

Referring to FIGS. 7 and 8, prisms 153c and 153d are disposed between the first and last prisms 153a and 153b. Each of the prisms 153a through 153b within a prism pattern 153 have a width W2 in a range from about 3 μm to about 30 μm in the first direction D1. In addition, the each of the prisms 153a through 153b may be spaced apart from each other by a predetermined pitch P2 in the first direction D1. The pitch P2 is taken between same positions among the prisms within a group of prisms arranged in the first direction D1 defining the prism pattern 153, such as being between edges of the prisms closest to the light incident surface 150*c*.

FIGS. 7 and 8 illustrate that the pitch P2 between the prisms 153*c* and 153*d* disposed adjacent to each other in the first direction D1 is substantially the same, but exemplary embodiments are not limited thereto. In an alternative exemplary embodiment, the pitch P2 between the prisms 153*c* and 153*d* disposed adjacent to each other in the first direction D1 may decrease from the light incident surface 150*c* toward the light opposing surface 150*d*, as a distance from the light incident surface 150*c* increases.

Each of the prisms within a group of prisms arranged in the first direction D1 defining the prism pattern 153, includes inclined surfaces extending from the lower surface 150*b* of the light guide plate 150. In FIG. 8, for example, an angle θ2 between inclined surfaces 153*c'* and 153*d'* of the prisms 153*c* and 153*d*, and the lower surface 150*b* of the light guide plate 150, respectively, may be in a range from about 127 degrees to about 134 degrees. The inclined surfaces 153*c'* and 153*d'* of the prisms such as 153*c* and 153*d* may be parallel to each other along an entirety of the length of such prisms, but are not limited thereto.

As such, referring to FIGS. 5 and 6 once again, the light guide plate 150 according to an exemplary embodiment includes, at the lower surface 150*b* thereof, the plurality of prisms within a single prism pattern 153 that increase gradually in length as prisms are position along the first direction from the light incident surface 150*c* toward the light opposing surface 150*d*, so that light emitted through the light guide plate 150 may be uniformly provided to the display panel. In an exemplary embodiment, for example, the light provided from the light source unit 140 becomes weaker from the light incident surface 150*c* toward the light opposing surface 150*d*, such that lengths of the plurality of prisms within a single prism pattern 153 increase gradually from the light incident surface 150*c* toward the light opposing surface 150*d*.

Accordingly, in order to provide light uniformly to the display panel 120, among pairs of prisms within a single prism pattern 153 (e.g., 153*a* and 153*b* or 153*c* and 153*d* illustrated in FIGS. 5-8), an amount of light reflected at the prism closer to the light incident surface 150*c* is reduced and an amount of light reflected at the prism closer to the light opposing surface 150*d* is increased.

That is, according to an exemplary embodiment, the length of the prism 153*a* disposed closest to the light incident surface 150*c* is substantially minimized and the lengths of remaining prisms within the single prism pattern 153 gradually increase to the prism 153*b*, so that uniform light may be provided to the display panel 120.

Figure 9:
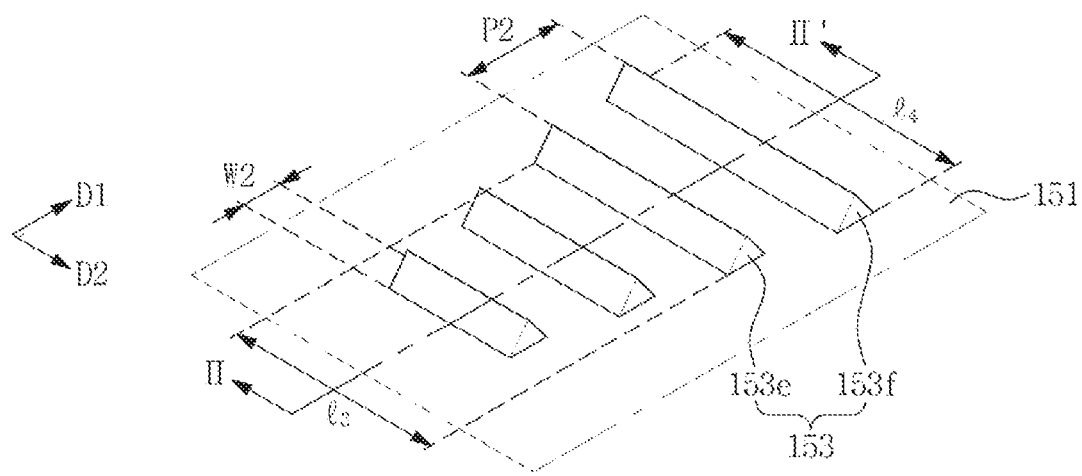
FIG. 9 is an enlarged perspective view illustrating a modified exemplary embodiment of a light guide plate according to the invention.
Figure 10:
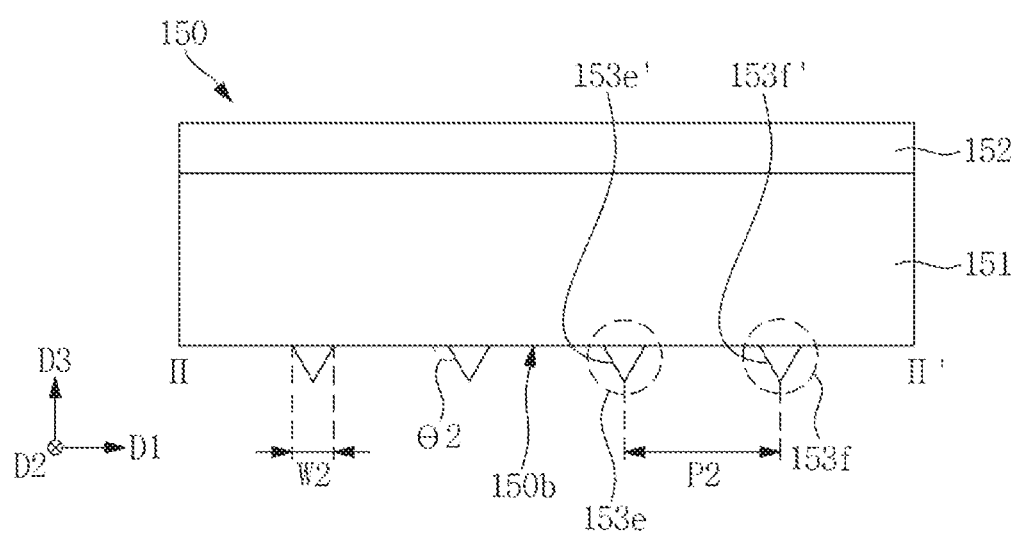
FIG. 10 is an enlarged cross-sectional view taken along line II-II' of FIG. 9.

FIG. 9 is an enlarged perspective view illustrating a modified exemplary embodiment of a light guide plate 150 according to the invention, and FIG. 10 is a cross-sectional view taken along line II-II' of FIG. 9. FIGS. 9 and 10 are perspective views illustrating a portion of a lower surface 150*b* of the light guide plate 150 according to an alternative exemplary embodiment. For convenience of explanation, repeated description of the light guide plate 150 in FIGS. 5 through 8 will be omitted from the description related to the light guide plate 150 of FIGS. 9 and 10.

Referring to FIGS. 9 and 10, the light guide plate 150 according to an alternative exemplary embodiment may include a prism pattern 153 disposed or formed at the lower surface 150*b*. The prism pattern 153 according to an alternative exemplary embodiment may be disposed or formed in at least one of an engraved (e.g., recessed) form and an embossed (e.g., protruded) form. For purpose of explanation, the prisms of the prism pattern 153 according to an alternative exemplary embodiment is assumed to be a protruded pattern extended away from a main portion of the body portion 151 of the light guide plate 150 from a lower surface of the body portion 151 which is common to each prism. That is, it is considered that a portion of the body portion 151 extends to define the protruded prisms of the prism pattern 153. Inclined surfaces of the prisms and the portions of the body portion 151 therebeteween may together form the lower surface 150*b* of the overall light guide plate 150. Portions of the lower surface of the body portion 151 which are between the prisms are coplanar with each other.

Among prisms within the prism pattern 153, prisms 153*e* and 153*f* are arranged along a first direction D1 perpendicular to a light incident surface (not illustrated). The prisms 153*e* and 153*f* may have lengths 13 and 14 which extend in a second direction D2 parallel to the light incident surface 150*c*. The prisms 153*e* and 153*f* may represent a pair of prisms within a single prism pattern 153, such as being between a first prism closest to the light incident surface 150*c* and a second prism closest to the light opposing surface 150*d*.

The lengths of the plurality of prisms arranged along the first direction D1 may increase gradually from the light incident surface 150*c* toward the light opposing surface 150*d*. Referring to FIG. 9, the lengths 13 and 14 of the plurality of prisms 153*e* and 153*f* arranged along the first direction D1 may increase gradually toward the first direction D1. That is, lengths of the prisms represented by prisms 153*e* and 153*f* within a prism pattern 153 increase as a distance of the prisms from the light incident surface 150*c* increases. Each of the prisms within a prism pattern 153, such as represented by prisms 153*e* and 153*f*, may have a length in a range from about 3 μm to about 300 μm.

As representing the prisms within a prism pattern 153, each of the prisms 153*e* and 153*f* may have a width W2 in a range from about 3 μm to about 30 μm in the first direction D1.

In addition, as further representing the prisms within a prism pattern 153, the prisms 153*e* and 153*f* may be spaced apart from each other by a predetermined pitch P2 in the first direction D1.

Each of the prisms within a group of prisms arranged in the first direction D1 defining the prism pattern 153, includes inclined surfaces extending from the lower surface 150*b* of the body portion 151 of the light guide plate 150. As further representing the prisms within a prism pattern 153, an angle θ2 between inclined surfaces 153*e'* and 153*f'* of the prisms 153*e* and 153*f* and the lower surface 150*b* of the body portion 151 of the light guide plate 150 may be in a range from about 127 degrees to about 134 degrees. The inclined surfaces 153*e'* and 153*f'* of the prisms such as 153*e* and 153*f* may be parallel to each other along an entirety of the length of such prisms, but are not limited thereto.

As such, the light guide plate 150 according to an exemplary embodiment includes, as the lower surface 150*b* of the light guide plate 150, the plurality of prisms 153*e* and 153*f* extended from a lower surface of the body portion 151, that increase gradually in length from the light incident surface 150*c* toward the light opposing surface 150*d* so that light emitted through the light guide plate 150 may be uniformly provided to the display panel 120.

Figure 11:
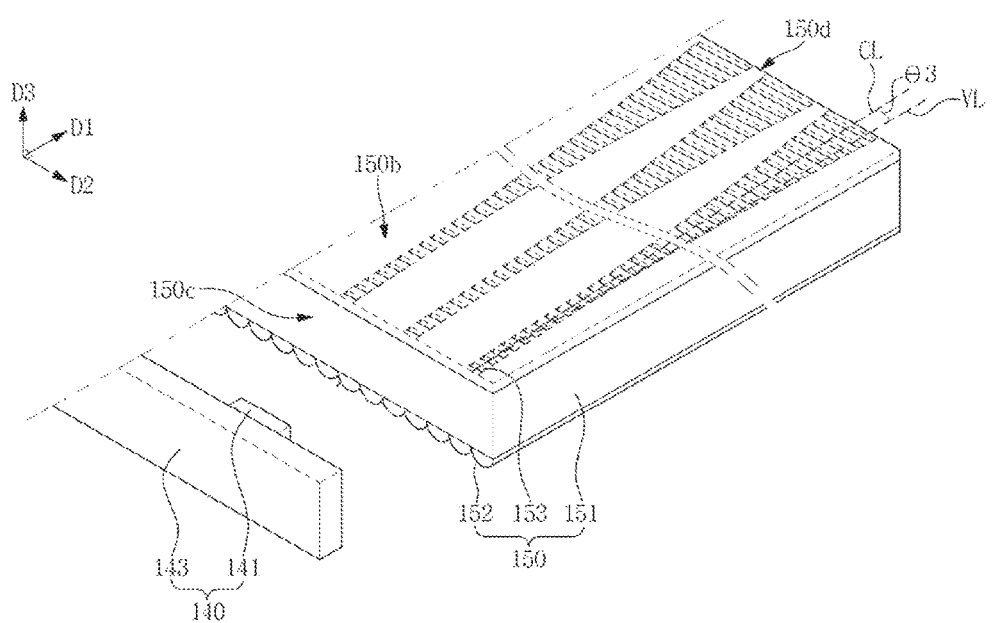
FIGS. 11, 12, 13 and 14 are enlarged perspective views illustrating modified exemplary embodiments of a light guide plate relative to a light source unit according to the invention.

FIG. 11 is an enlarged perspective view illustrating a modified exemplary embodiment of a portion of a light guide plate according to the invention. FIG. 11 is a perspective view illustrating a lower surface 150b and a light incident surface 150c of the light guide plate 150 according to an alternative exemplary embodiment. For convenience of explanation, repeated description of the light guide plate 150 according to previous exemplary embodiments will be omitted from the description related to the light guide plate 150 of FIG. 11.

Referring to FIG. 11, the light guide plate 150 according to an alternative exemplary embodiment may include a prism pattern 153 disposed or formed at the lower surface 150b. The prism pattern 153 may include a plurality of prisms arranged along a common center line CL tilted by an angle θ3 ranging from about 0.5 degrees to about 10 degrees with respect to a virtual line VL parallel to a first direction D1. The prisms of a prism pattern 153 may be aligned along the center line CL. Each prism within a single prism pattern 153 may by symmetrical with respect to the center line CL. Each prism within a prism pattern 153 may have a center thereof defined along the second direction, and the center line CL extends through the center of each prism. Among prisms in the single prism pattern 153, lengths of the prisms may increase gradually as a distance from the light incident surface 150c increases toward the first direction D1. In addition, the prism pattern 153 may be provided in plurality along a second direction D2.

As such, the light guide plate 150 according to an alternative exemplary embodiment is configured such that an arrangement line of the prisms within the prism pattern 153 disposed or formed at the lower surface 150b has a predetermined tilting angle θ3 with respect to the virtual line VL parallel to the first direction D1, and accordingly, moiré stains may be substantially prevented from appearing.

Figure 12:
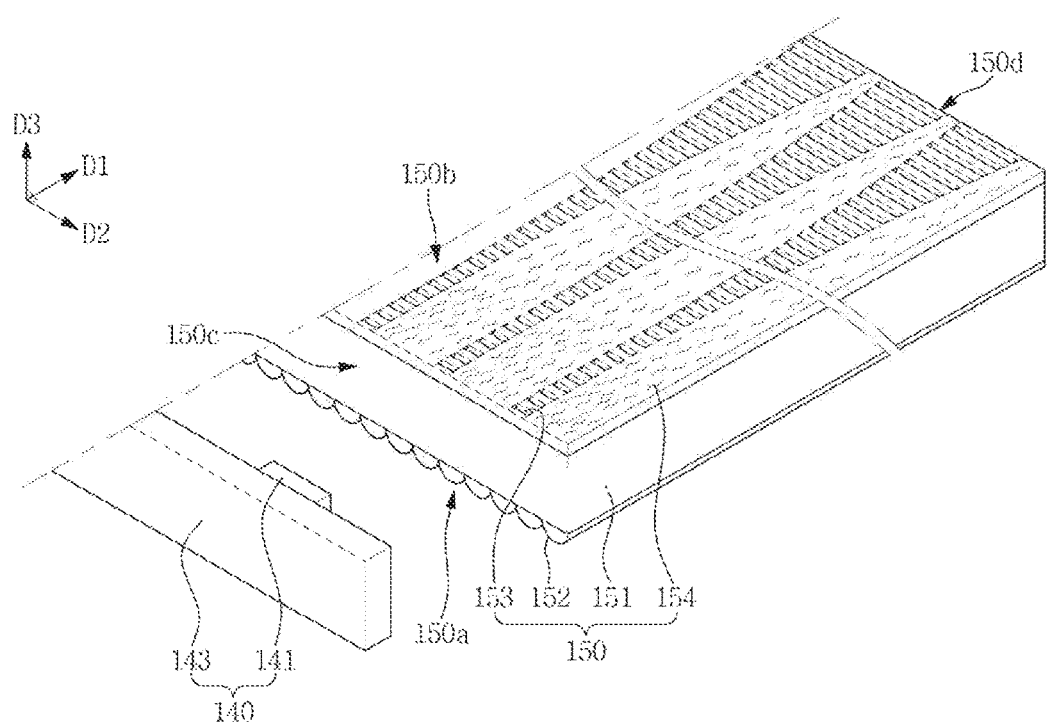
Figure 13:
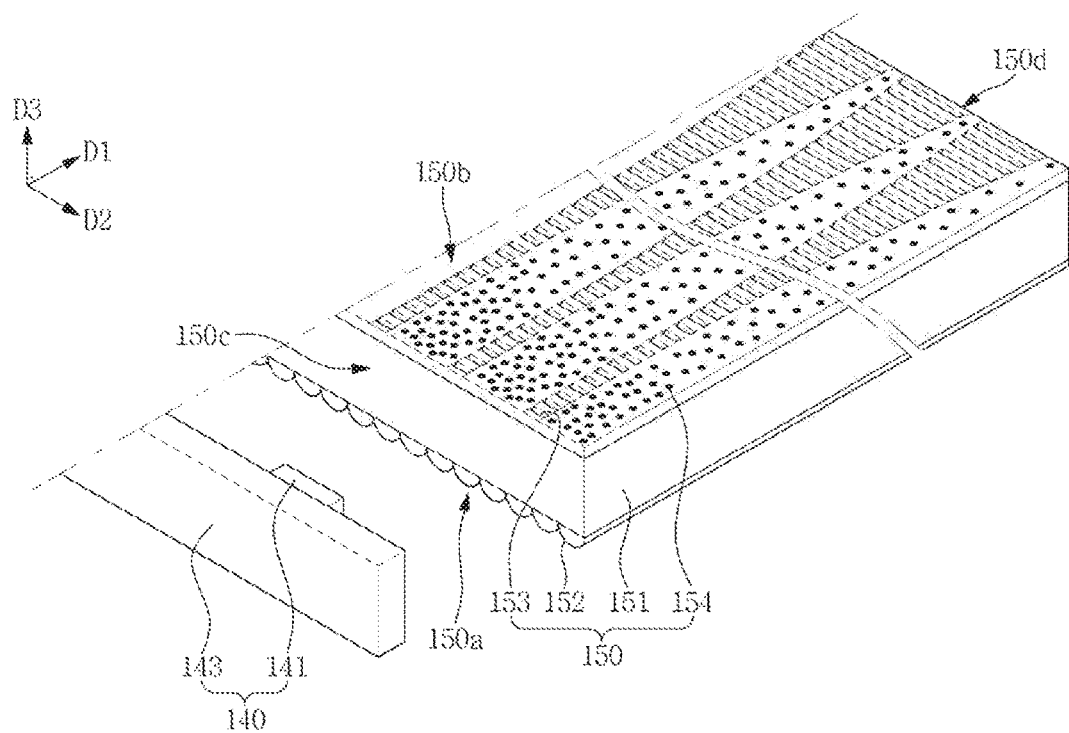

FIG. 12 is an enlarged perspective view illustrating another modified exemplary embodiment of a portion of a light guide plate 150 according to the invention, and FIG. 13 is an enlarged perspective view illustrating still another modified exemplary embodiment of a light guide plate 150 according to the invention. FIGS. 12 and 13 are perspective views illustrating a lower surface 150b and a light incident surface 150c of the light guide plate 150 according to an alternative exemplary embodiment. For convenience of explanation, repeated description of the light guide plate 150 according to previous exemplary embodiments will be omitted from the description related to the light guide plate 150 in FIGS. 12 and 13.

Referring to FIGS. 12 and 13, the light guide plate 150 according to an alternative exemplary embodiment may include a prism pattern 153 disposed or formed at the lower surface 150b. The prism pattern 153 may include a plurality of prisms arranged along a first direction D1, and lengths of the prisms may increase gradually as a distance from the light incident surface 150c increase toward the first direction D1. In addition, the prism pattern 153 may be provided in plurality along a second direction D2.

The light guide plate 150 according to an alternative exemplary embodiment may further include a light scattering pattern 154 between the prism patterns 153. The light scattering pattern 154 may be disposed between the prisms within a prism pattern 153.

The light scattering pattern 154 may be provided in plural to have a discrete shape such as a hairline (e.g., non-linear line) shape (see FIG. 12) or a dot shape (see FIG. 13). The light scattering patterns 154 are discrete shapes disposed spaced apart from each other. The light scattering patterns 154 scatter light passing through the inside of the light guide plate 150 to allow the light to be emitted through an upper surface 150a of the light guide plate 150.

The light scattering patterns 154 are disposed or formed at the lower surface 150b of the light guide plate 150 so that a certain portion of the light guide plate 150 does not appears as a bright portion or a dark portion because at the light scattering patterns 154, light may be condensed at or may not reach the certain portion may be canceled out. That is, the light scattering patterns 154 may control the occurrence of the light or dark portion generated because of the interference of light due to a light path difference.

A quantity of the light scattering pattern 154 in a unit area (e.g., density) may be gradually reduced as a distance from the light incident surface 150c toward the light opposing surface 150d increase. As the light guide plate 150 includes the prism pattern 153 at the lower surface 150b, where lengths of the prisms of the prism pattern 153 increase from the light incident surface 150c toward the light opposing surface 150d, an area of the light guide plate 150 adjacent to the light incident surface 150c may appear as a relatively dark portion. Accordingly, the light scattering pattern 154 is formed at a region adjacent to the light incident surface 150c, to have a greater density, so that light may be uniformly emitted from an entire surface of the light guide plate 150.

In an exemplary embodiment of manufacturing a light guide plate 150, such a light scattering pattern 154 may be formed by processing a surface using a sand blaster or by applying a paint that scatters light. That is, the light scattering pattern 154 may be recessed from the lower surface 150b of the light guide plate 150 or may be protruded from the lower surface of the body portion 151.

Figure 14:
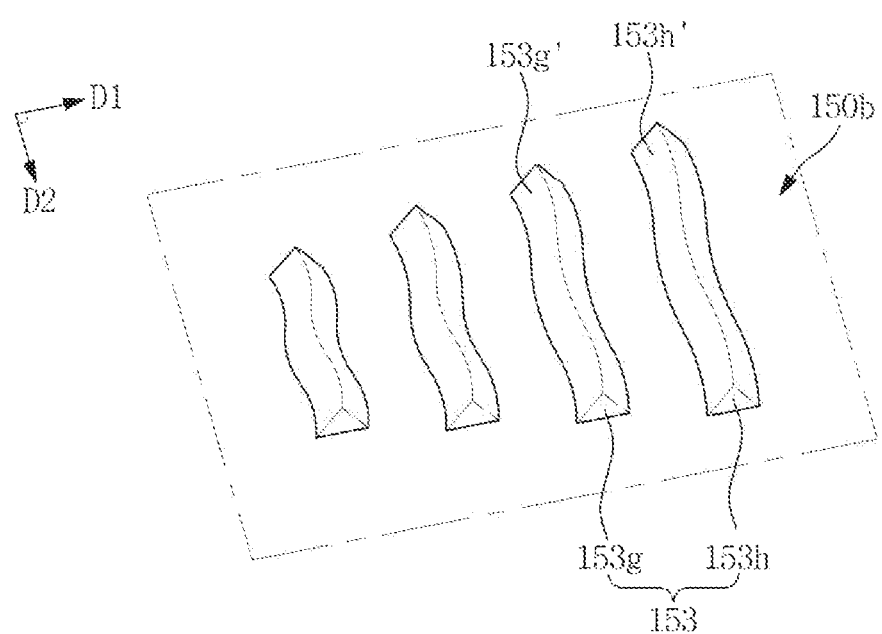

FIG. 14 is an enlarged perspective view illustrating yet another modified embodiment of a portion of a light guide plate 150 according to the invention. FIG. 14 is a perspective view illustrating a lower surface 150b of the light guide plate 150 according to an alternative exemplary embodiment. For convenience of explanation, repeated description of the light guide plate 150 according to previous exemplary embodiments will be omitted from the description related to the light guide plate 150 in FIG. 14.

Referring to FIG. 14, the light guide plate 150 according to an alternative exemplary embodiment may include a prism pattern 153 disposed or formed at the lower surface 150b. The prism pattern 153 may include a plurality of prisms, such as 153g and 153h, arranged along a first direction D1. Among prisms within a single prism pattern 153, lengths of the prisms in a second direction D2 may increase gradually as a distance of the prisms from the light incident surface 150c increases in the first direction D1.

Inclined surfaces 153g' and 153h' of the prisms 153g and 153h disposed adjacent to each other in the first direction D1 may be formed to be not parallel to each other or to the second direction D2. That is, each of the prisms 153g and 153h may have irregularly shaped inclined surfaces 153g' and 153h'. That is, the inclined surfaces 153g' and 153h' of the prisms such as 153g and 153h may not be parallel to each other along an entirety of the length of such prisms, but are not limited thereto.

As such, the light guide plate 150 according to an alternative exemplary embodiment includes the plurality of prisms such as 153g and 153h including the irregularly shaped inclined surfaces 153g' and 153h', and accordingly, moiré stains may be substantially prevented from appearing.

As set forth hereinabove, according to one or more exemplary embodiment, an overall thickness of a display device may be reduced by omitting the optical sheet of a conventional display device, and the manufacturing costs may be reduced.

According to one or more exemplary embodiments, the display device may collimate the light emitted from the light source and substantially prevent the light guide plate from being visible, by the light guide plate including the lens pattern on the upper (light emission) surface of the light guide plate.

According to one or more exemplary embodiments, the light guide plate of the display device includes the prism pattern on the lower surface of the light guide plate so that light emitted from the light guide plate may be uniformly provided to the display panel.

According to one or more exemplary embodiments, the display device may substantially prevent moiré stains from appearing by the light guide plate including discrete patterns disposed or formed at the upper and lower surfaces of the light guide plate tilted or having no regularity.

While the invention has been illustrated and described with reference to the exemplary embodiments thereof, it will be apparent to those of ordinary skill in the art that various changes in form and detail may be made thereto without departing from the spirit and scope of the invention.

What is claimed is:

1. A display device comprising:
   a display panel which displays an image;
   a light source which generates light; and
   a light guide plate which receives the light from the light source and provides the light to the display panel, the light guide plate comprising:
      an upper surface facing the display panel, the upper surface comprising a lens pattern,
      a lower surface opposing the upper surface, the lower surface comprising a prism pattern,
      a light incident surface facing the light source, and
      a light opposing surface opposing the light incident surface,
   wherein
   the prism pattern comprises a prism provided in plurality arranged along a first direction from the light incident surface to the light opposing surface,
   the prism comprises an inclined surface extended from the lower surface of the light guide plate, each inclined surface of the plurality of prisms includes a curved portion,
   each of the prisms has a length extending in a second direction along a length of the light incident surface, and
   among the prisms arranged along the first direction within the prism pattern, the lengths of the prisms increase as a distance from the light incident surface increases.

2. The display device as claimed in claim 1, wherein the prism is a recessed portion of the light guide plate or a protruded portion of the light guide plate.

3. The display device as claimed in claim 1, wherein the length of the prism is in a range from about 3 micrometers to about 300 micrometers.

4. The display device as claimed in claim 1, wherein
   the prism comprises an inclined surface extended from the lower surface of the light guide plate, and
   the inclined surface of the prism forms an angle ranging from about 127 degrees to about 134 degrees with respect to the lower surface of the light guide plate.

5. The display device as claimed in claim 1, wherein the curved portion of the prism having a greater length has a greater curvature.

6. The display device as claimed in claim 1, wherein
   each of the prisms has a width extending in the first direction, and
   the width ranges from about 3 micrometers to about 30 micrometers.

7. The display device as claimed in claim 1, wherein
   a pitch is defined in the first direction between prisms arranged adjacent to each other along the first direction, and
   among the prisms arranged along the first direction within the prism pattern, the pitches of the prisms decrease as the distance from the light incident surface increases.

8. The display device as claimed in claim 1, wherein the prism pattern is provided in plurality along the second direction.

9. The display device as claimed in claim 8, wherein
   a pitch is defined in the second direction between a first prism of a first prism pattern and a second prism of a second prism pattern arranged adjacent to each other along the second direction, and
   the pitch is in a range from about 50 micrometers to about 300 micrometers.

10. The display device as claimed in claim 1, wherein the lens pattern comprises a lens provided in plurality arranged along the second direction, each of the lenses having a semicircular or semi-elliptical cross-section and a length extending in the first direction.

11. The display device as claimed in claim 10, wherein the lens has a width extending in the second direction, the width ranging from about 3 micrometer to about 30 micrometers.

12. The display device as claimed in claim 10, wherein the lens has a height extending from the upper surface of the light guide plate, the height ranging from about 3 micrometers to about 15 micrometers.

13. The display device as claimed in claim 1, wherein
   the prism pattern is provided in plurality along the second direction, and
   the light guide plate further comprises a light scattering pattern provided in plurality between the prism patterns.

14. The display device as claimed in claim 13, wherein
   the light scattering patterns are arranged along the first direction, and
   a density of the light scattering patterns is reduced as the distance from the light incident surface increases.

15. The display device as claimed in claim 13, wherein the light scattering pattern has a discrete non-linear shape.

16. The display device as claimed in claim 13, wherein the light scattering pattern has a discrete dot shape.

17. The display device as claimed in claim 1, wherein the curved portion includes a convex portion and a concave portion.

18. The display device as claimed in claim 1, wherein within the prism pattern including the lengths of the prisms which increase as the distance from the light incident surface increases, the prisms are spaced apart from each other in the first direction.

19. The display device as claimed in claim 1, wherein within the prism pattern including the lengths of the prisms which increase as the distance from the light incident surface increases, a single prism is arranged along the second direction.

20. A display device comprising:
   a display panel which displays an image;
   a light source which generates light; and
   a light guide plate which receives the light from the light source and provides the light to the display panel, the light guide plate comprising:
      an upper surface facing the display panel, the upper surface comprising a lens pattern, a lower surface opposing the upper surface, the lower surface comprising a prism pattern, a light incident surface facing the light source, and a light opposing surface opposing the light incident surface, wherein a virtual line is defined extended in a first direction from the light incident surface to the light opposing surface, the virtual line perpendicular to a length of the light incident surface, the prism pattern comprises a prism provided in plurality arranged along a center line extended in the first direction, the center line tilted by an angle ranging from about 0.5 degrees to about 10 degrees with respect to the virtual line, the prism comprises an inclined surface extended from the lower surface of the light guide plate, each inclined surface of the plurality of prisms includes a curved portion, each of the prisms has a length extending in a second direction along the length of the light incident surface, and among the prisms arranged along the center line tilted with respect to the virtual line, the lengths of the prisms increase as a distance from the light incident surface increases.

21. A display device comprising:

a display panel which displays an image;

a light source which generates light; and a light guide plate which receives the light from the light source and provides the light to the display panel, the light guide plate comprising:

an upper surface facing the display panel, the upper surface comprising a lens pattern, a lower surface opposing the upper surface, the lower surface comprising a prism pattern, a light incident surface facing the light source, and a light opposing surface opposing the light incident surface, wherein the prism pattern of the lower surface of the light guide plate comprises a prism provided in plurality arranged along a first direction from the light incident surface to the light opposing surface, the prism comprises an inclined surface extended from the lower surface of the light guide plate, each inclined surface of the plurality of prisms includes a curved portion, each of the prisms has a length extending in a second direction along a length of the light incident surface, among the prisms arranged along the first direction within the prism pattern, the lengths of the prisms increase as a distance from the light incident surface increases, and with respect to a virtual line extended in the first direction to be perpendicular to the length of the light incident surface, the lens pattern of the upper surface of the light guide plate has a length forming a tilting angle ranging from about 0.5 degrees to about 10 degrees with respect to the virtual line.

* * * * *